| United States Patent [19] | [11] Patent Number: 4,609,541 |
| --- | --- |
| Calderon | [45] Date of Patent: Sep. 2, 1986 |

[54] METHOD OF PROCESSING COAL GAS

[76] Inventor: Albert Calderon, 1065 Melrose St., Bowling Green, Ohio 43402

[21] Appl. No.: 711,241

[22] Filed: Mar. 13, 1985

[51] Int. Cl.$^4$ ......................... B01D 53/34; C01B 17/04
[52] U.S. Cl. .................................... 423/569; 423/230; 423/570; 423/571; 423/638
[58] Field of Search ............... 423/230, 569, 570, 571, 423/573 R, 638, 168, 444

[56] References Cited

U.S. PATENT DOCUMENTS

| 2,090,797 | 8/1937 | Lindblad . | |
| --- | --- | --- | --- |
| 2,635,947 | 4/1953 | Reed et al. | 423/571 |
| 3,810,972 | 5/1974 | Humphrey et al. | 423/569 |
| 4,041,141 | 8/1977 | Moss | 423/569 |

OTHER PUBLICATIONS

"Gasifier Produces Clean Fuel from Resid and Lignite for Natural-Gas-Fired Boiler", 1981 *Generation Planbook*, pp. 94–95.
"Coal Gasification Systems: A Guide to Status Applications, and Economics", prepared for EPRI, Project No. 2207, Jun. 1983.
Aerotherm Report 75-134, by Robert W. Fulton et al., prepared for U.S. EPA, Jan. 1975.
"Current Industrial Use of Low BTU Gas from Coal; I and II", W. G. Coffeen, Industrial Heating, 11-1983 (pp. 18–20), 12-1983, (pp. 38–40,54).
"Kiln Gas Commercial Module", Robert M. Seidl, Industrial Heating, 11-1984, pp. 23–25.
"Evaluation of Coal Gasification Technology, Part II", prepared for U.S. Dept. Int. 1974, pp. 1–11, 40–41, 46–49, 60–65.
"Status of Surface Coal Gasification Projects in U.S.", Strickland et al., Industrial Heating, 11-1983, pp. 12–14, & 16.
"First U.S. Coal Gasification Facility in Commercial Operation", Industrial Heating, 11-1984, pp. 20–22.
"Methane from Coal Aided by Use of Potassium Catalyst", Leanard Kaplan, Chemical Engineering, 3-2-2-1982, pp. 64–66.
"Commercialization of the Texaco Coal Gasification Process", Schlinger et al., Industrial Heating, 11-1981, pp. 10–12.

*Primary Examiner*—John Doll
*Assistant Examiner*—Jeffrey Edwin Russel
*Attorney, Agent, or Firm*—Renner, Otto, Boisselle & Lyon

[57] ABSTRACT

An improved method for the recovery of elemental sulfur(S) from a coal-gas containing hydrogen sulfide (H$_2$S) wherein hot lime (CaO) is used and then regenerated according to the following chemistry:

$$CaO + H_2S = CaS + H_2O$$

$$CaS + 3/2\ O_2 = CaO + SO_2$$

$$SO_2 + C = S + CO_2$$

These chemical reactions are conducted in-situ while the supply of carbon (C) for the formation of the elemental sulfur(S) is derived from a component of the coal-gas itself to increase the overall efficiency of desulfurization, increase the uniformity of the carbon deposit into the hot lime (CaO), and eliminate the extra and cumbersome steps of physically moving the spent lime (CaO) for regeneration and returning it after regeneration, and the step of adding coal to react with the sulfur dioxide (SO$_2$) formed as an off-gas during regeneration.

10 Claims, No Drawings

METHOD OF PROCESSING COAL GAS

BACKGROUND OF THE INVENTION

The instant invention relates to the dry clean-up of gases in hot lime (CaO) wherein the lime (CaO) is regenerated and sulfur(S) is recovered in elemental form.

In particular this invention is an improvement over the process described on pages 94 and 95 of the 1981 *Generation Planbook* edition, entitled "Gasifier Produces Clean Fuel from Resid and Lignite for Natural-gas-fired Boiler", a copy of the article being attached for reference.

This reference describes the injection of a high-sulfur fuel such as oil or coal, into a hot bed of calcined limestone (CaO) which is contained in a first reactor, the calcined limestone (CaO) being fluidized by a mixture of flue-gas and air to gasify the oil or coal. When the calcined limestone (CaO) becomes spent and takes the form of calcium sulfide (CaS) it is physically transferred while hot to a second reactor for regeneration with air ($O_2$) to convert the calcium sulfide (CaS) back to calcined limestone (CaO) and thereby yield a sulfur dioxide ($SO_2$) off-gas. The hot regenerated calcined limestone (CaO) is then physically returned to the first reactor for further sulfur collection from the high-sulfur oil or coal. The sulfur dioxide ($SO_2$) off-gas produced is directed from the second reactor to a third reactor where coal is charged to supply the carbon needed for forming elemental sulfur(S). Ash from the coal leaves as a residue from the third reactor.

The disadvantagees of the reference are as follows:

1. The fuel such as the oil or coal is gasified with the lime (CaO); this causes the creation of excessive fines and the mixing of the ash with the desulfurizing agent (CaO), which decreases the efficiency of sulfur(S) collection by the lime (CaO) thereby causing the increase of lime (CaO) consumption and a greater disposal problem.

2. The physical transfer of the hot spent lime in the form of calcium sulfide (CaS) to a second reactor for regeneration and the physical transfer of the hot regenerated lime (CaO) back to the reactor where the gasification takes place are movements which necessitate the moving of hot material which is erosive and abrasive resulting in the increase of maintenance costs and the creating of additional fines which must be disposed of.

3. The directing of the sulfur dioxide ($SO_2$) to a third reactor where it mixes with coal for the formation of elemental sulfur(S), generates a tail gas which must be recycled, ash from the coal that must be disposed of, and the reaction of coal with sulfur dioxide ($SO_2$) requires control air which must be fed to the third reactor.

4. The capital and operating costs are too high.

SUMMARY OF THE INVENTION

The instant invention eliminates the above disadvantages by gasifying a carbonaceous fuel by any one of the known processes to make a raw-gas containing by way of example the following components:

$CO$, $CO_2$, $H_2$, $CH_4$, $N_2$, $O_2$, $H_2S$, $H_2O$, and in certain cases, aromatics are also part of the raw-gas depending upon the gasification process used.

This raw-gas, while still hot is passed through a fixed bed of lime (CaO), preferably pebble lime whose temperature is maintained above the cracking temperature of hydrocarbons contained in the gas in order to crack such hydrocarbons to cause the deposit of carbon (C) into the pebble lime (CaO) while the hydrogen sulfide ($H_2S$) in the gas reacts with the lime (CaO) yielding calcium sulfide (CaS) and water ($H_2O$). This simultaneous carbon deposit and sulfur collection by the lime (CaO) yields a carbon impregnated calcium sulfide (CaS) which when exposed to oxygen efficiently converts back to lime (CaO) without degradation yielding sulfur dioxide ($SO_2$) which is immediately exposed to the impregnated carbon to react with it in-situ to in turn yield elemental sulfur(S) in vapor form and carbon dioxide ($CO_2$).

The applicant believes that he has invented a new and useful method for the recovery of elemental sulfur from a raw-gas such as a coal-gas whose main object is to provide a superior as well as economical method of clean-up of said gas which clean-up has heretofore been cumbersome and very costly.

Another object of the present invention is the provision of a method wherein the clean-up of the raw-gas and the formation of the elemental sulfur(S) are performed in-situ in order to avoid the transfer of the desulfurizing agent and to prevent its disintegration.

Still another object of the instant invention is the provision of a method wherein the raw-gas is passed while hot through hot lime (CaO) to greatly increase the reactivity of the sulfur bearing component of the gas with said lime (CaO) to form calcium sulfide (CaS) and water ($H_2O$).

Yet another object of the present invention is the provision of a method wherein the hot raw-gas containing hydrocarbons such as tar, is passed through hot lime (CaO) whose temperature is maintained above the cracking temperature of said hydrocarbons in order to cause the deposit of carbon (C) into said lime (CaO) simultaneously with the collection of the sulfur(S) component contained in said raw-gas to form a carbon (C) impregnated calcium sulfide (CaS), and clean gas virtually free of sulfur and hydrocarbons.

Therefore another object of the instant invention is the provision of a method wherein said lime (CaO) is regenerated from said carbon (C) impregnated calcium sulfide (CaS) in-situ by oxidizing the sulfur(S) in said calcium sulfide (CaS) to yield calcium oxide (CaO) and sulfur dioxide ($SO_2$).

Further another object of the present invention is the provision of a method wherein sulfur dioxide ($SO_2$) reacts with said deposited carbon (C) in-situ to form elemental sulfur(S) in vapor form and carbon dioxide ($CO_2$).

Further still another object of the instant invention is the provision of a method wherein the collection of said elemental sulfur(S) in vapor form and said carbon dioxide are collected and cooled for separating the elemental sulfur(S) from the carbon dioxide ($CO_2$).

It is further still another object of the present invention to provide a method wherein the lime (CaO) used for desulfurization becomes physically stronger by virtue of the uniform deposit of carbon (C) into said lime (CaO) during the raw-gas passage through said lime (CaO).

Therefore still another object of the instant invention is the provision of a method wherein two alternating systems are provided in order to sequence the systems back and forth in such a way as to have one system on the simultaneous deposition of carbon (C) and collection of sulfur(S) by said lime (CaO) to form an impregnated calcium sulfide (CaS), and the other system on the simultaneous regeneration of said lime (CaO) from said calcium sulfide (CaS) and the formation of elemental sulfur(S).

Other objects of this invention will appear from the following detailed description and appended claims. Before explaining in detail the present invention, it is to be understood that this invention is not limited to the details of the following description, since the invention is capable of having other embodiments without departing from the spirit of the invention. Also it is to be understood that the phraseology or terminology herein set forth is for the purpose of description and not limitation.

DETAILED DESCRIPTION OF INVENTION

This invention was developed in conjunction with the clean-up of coal gases produced during the devolatilization of high sulfur coal in the absence of oxygen in an 18" diameter cylinder, 4 feet high having a 1½" thick wall. The bottom of the cylinder had a 1" plate welded to it in order to prevent gases escaping from the bottom. The cylinder was circumferentially insulated with Kaowool and imbedded in sand. The top of the cylinder had a flange to which a gasketted cover was tightly bolted. Four inches below the flange an exhaust port was provided.

A second cylinder of the same dimensions and configuration as the first cylinder was located at a distance of 9 feet from the first cylinder. The second cylinder had an internal diaphragm along its vertical length to provide two chambers within it. The diaphragm was 44 inches in length and mounted in such a way as to have a gap of 4 inches between the bottom of the cylinder and the bottom of the diaphragm. This gap was provided for the gases to flow from one chamber to the other as the gas flowed downwardly in the first chamber and upwardly in the second chamber. Four inches below the flange of this second cylinder two ports, an entry port and an exhaust port, were provided in such a way as to have the entry port in the first chamber and the exhaust port in the second chamber.

A 9-foot pipe fully insulated interconnected the exhaust port of the first cylinder to the entry port of the second cylinder, the reason for such insulation being the prevention of hydrocarbon condensation. A two-foot long pipe equipped with a control valve was mounted on the exhaust port of the second cylinder, two gas sampling ports were provided one upstream of the second cylinder in the 9-foot pipe and the other downstream of the second cylinder in the 2-foot pipe ahead of the control valve. Pebble lime (CaO) sized minus 3" to plus ¼" mesh was charged in both chambers of the second cylinder to two inches below the entry and exhaust ports. The pebble lime (CaO) was the same pebble lime as that which is used in basic oxygen steelmaking furnaces. A steel cover made of one-inch thick plate with a gasket was then tightly bolted to the flange of the second cylinder so that no gas could escape between the cover and the cylinder.

A high sulfur Ohio coal containing 3.2% sulfur(S) was charged into the first cylinder to two-inches below its exhaust port. A steel cover made of one-inch thick plate with a gasket was also tightly bolted to the flange of the first cylinder.

Operation

The pebble lime (CaO) in the second cylinder was gradually heated in the absence of oxygen until the temperature of the pebble lime (CaO) reached 1650° F. which took 4 hours:25 minutes. After reaching this temperature in the second cylinder and maintaining same, heat was applied to the first in the absence of oxygen, and volatile matter started leaving the coal at 0 hours:42 minutes after start of heat application on the first cylinder.

Observation #1. Gas leaving exhaust port of second cylinder, visually clean.

Observation #2. Gas sampled upstream of second cylinder for hydrogen sulfide ($H_2S$)—2.6%.

Observation #3. Gas sampled downstream of second cylinder for hydrogen sulfide ($H_2S$)—0.05%.

Observation #4. Checked for volatile matter leaving upstream of cylinder—abundant evolution of yellowish foul gas.

Observation #5. Gas leaving exhaust port of second cylinder, checked for condensables (tars, oil $NH_3$, etc.)—non-detectable.

Observation #6. Gas sampled up stream of second cylinder for hydrogen sulfide ($H_2S$) again—1.5%.

Observation #7. Gas sampling of downstream of second cylinder for hydrogen sulfide ($H_2S$) again—non-detectable.

Observation #8. 9-foot pipe disconnected, and cover of second cylinder removed—Calcium oxide (CaO) converted to calcium sulfide (CaS) and impregnated with carbon (C) all the way through each pebble.

Observation #9. Carbon (C) impregnated calcium sulfide (CaS) stronger than unused pebble lime (CaO).

Observation #10. Cover replaced on second cylinder and re-sealed. Air was blown in opposite direction of coal-gas flow; namely, from exhaust port through the calcium sulfide (CaS) and out of entry port, elemental sulfur(S) in vapor form and carbon dioxide ($CO_2$) released from bed. Bed temperature rose to 2745° F.

Observation #11. Cover of second cylinder removed—Calcium sulfide (CaS) converted back to calcium oxide (CaO), thusly regenerated in-situ.

CONCLUSION

Therefore as long as the temperature of the lime (CaO) is maintained above the cracking temperature of the hydrocarbons contained in the raw-gas, the hydrocarbons will crack and will deposit carbon (C) uniformly onto, into and throughout the lime (CaO) which is very porous. Such porosity is an inherent result of calcination of limestone ($CaCO_3$) into lime (CaO). Hot calcium oxide (CaO) is very reactive with hot hydrogen sulfide ($H_2S$). Since the raw-gas is hot when it leaves the gasification chamber and filters through hot calcium oxide (CaO), calcium sulfide is immediately formed. This simultaneous deposit of carbon (C) by cracking and the collection of the sulfur by reaction, provides an efficient and dry clean-up system not only of the tar, oil and other hydrocarbons but also of the sulfur from the raw-gas.

In the regeneration step, the spent lime (CaS) is left in-situ and the oxygen in the form of oxygen alone or in the form of air reacts with the calcium sulfide (CaS) to form calcium oxide (CaO) and sulfur dioxide ($SO_2$) but the sulfur dioxide at a temperature above the ignition point of carbon (C) reacts with the impregnated carbon (C) to result in the simultaneous regeneration of the lime (CaO) and the formation of elemental sulfur in vapor form in one single step. In addition to the formation of elemental sulfur(S), carbon dioxide ($CO_2$) is also evolved. The elemental sulfur(S) and carbon dioxide ($CO_2$) are collected, cooled and separated.

For the commercial application of the present invention, it is proposed to use two beds of pebble lime (CaO) simultaneously but sequenced in such a way as to have the first bed for carbon (C) deposit and sulfur(S) collection by the hot lime (CaO) and the second bed for regeneration of the lime (CaO) and the formation of the elemental sulfur(S), the raw-gas being directed through the first bed, and oxygen or air blown through the second bed in the opposite direction of the raw-gas. Once the calcium oxide (CaO) in the first bed is spent, namely converted to calcium sulfide (CaS), the raw-gas is directed through the second bed and the oxygen or air blown through the first bed in the opposite direction of the raw-gas; such alternate use of the beds continuing between sulfur(S) collection and regeneration as a mode of operation.

The instant invention is not limited to only the clean-up of a gas containing hydrogen sulfide ($H_2S$); it can be used for the clean-up of other gases containing components of sulfur(S).

All in all it is submitted that the present invention provides a superior and economical method of efficiently cleaning raw-gas for example coal gas, syngas, etc., which regenerates the desulfurizer (CaO) while forming elemental sulfur(S) in-situ.

I claim:

1. A method of processing a gas containing a compound of sulfur and hydrocarbon material, comprising a first step of directing the gas through a fixed bed of hot lime material whose temperature is maintained above the cracking temperature of the hydrocarbon material to simultaneously (i) react the compound of sulfur with the hot lime to produce calcium sulfide in the fixed bed and (ii) crack the hydrocarbon material while impregnating the calcium sulfide with carbon in the same fixed bed, and a second step of reacting the carbon impregnated calcium sulfide with a gas containing oxygen in order to (i) convert said calcium sulfide back to hot lime through regeneration and (ii) produce elemental sulfur.

2. The method as set forth in claim 1 wherein said gas containing oxygen is further characterized as being air.

3. The method as set forth in claim 1 wherein said gas containing oxygen is further characterized as being oxygen which is substantially pure.

4. The method as set forth in claim 1 wherein said second step of reacting the carbon impregnated calcium sulfide with a gas containing oxygen in order to (i) convert said calcium sulfide back to hot lime through regeneration and (ii) produce elemental sulfur is further characterized by the step of extracting said elemental sulfur in vapor form and subsequently condensing it.

5. The method as set forth in claim 4 wherein the step of extracting said elemental sulfur in vapor form and subsequently condensing it is further characterized by the step of separating said elemental sulfur from non-condensibles and collecting said non-condensibles.

6. The invention as set forth in claim 1 wherein said second step of reacting the carbon impregnated calcium sulfide with a gas containing oxygen is further characterized by the step of passing the gas containing oxygen in the opposite direction of the direction of the passage of said gas containing a compound of sulfur and hydrocarbon material.

7. The invention as set forth in claim 6 including the steps of providing at least two fixed beds of pebble lime, directing the gas containing a compound of sulfur and a hydrocarbon material through said one of the beds of hot lime to desulfurize and crack hydrocarbons in said one bed, and then directing the gas containing a compound of sulfur and a hydrocarbon material through another bed of lime and reacting said one bed with oxygen to generate elemental sulfur and to regenerate said one bed, thus allowing the reactions for desulfurization and cracking of the hydrocarbons and the reactions for regeneration and production of elemental sulfur to be alternated between said pair of beds.

8. The method as set forth in claim 1 wherein said gas containing a compound of sulfur and a hydrocarbon comprises a coal gas.

9. The method as set forth in claim 1 wherein said bed of lime comprises a bed of pebble lime.

10. The method as set forth in claim 1 wherein said hydrocarbon material comprises a tar.

* * * * *